(12) United States Patent
McDaniel et al.

(10) Patent No.: US 8,129,318 B2
(45) Date of Patent: Mar. 6, 2012

(54) METHODS AND COMPOSITIONS FOR DETERMINATION OF FRACTURE GEOMETRY IN SUBTERRANEAN FORMATIONS

(75) Inventors: Robert R. McDaniel, Houston, TX (US); Scott M. McCarthy, Fulshear, TX (US); Michael Smith, Montgomery, TX (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 0 days.

(21) Appl. No.: 12/789,094

(22) Filed: May 27, 2010

(65) Prior Publication Data
US 2010/0234249 A1    Sep. 16, 2010

Related U.S. Application Data

(62) Division of application No. 11/501,575, filed on Aug. 9, 2006, now Pat. No. 7,726,397.

(60) Provisional application No. 60/706,791, filed on Aug. 9, 2005.

(51) Int. Cl.
C23F 11/18    (2006.01)
(52) U.S. Cl. ......... 507/271; 507/270; 250/253; 250/260
(58) Field of Classification Search ............ 507/270, 507/271; 250/253, 260
See application file for complete search history.

(56) References Cited

U.S. PATENT DOCUMENTS

| | | | |
|---|---|---|---|
| 3,002,091 A | 9/1961 | Armstrong | |
| 3,004,161 A | 10/1961 | Rickard | |
| 3,019,341 A | 1/1962 | Ralph | |
| 4,034,218 A | 7/1977 | Turcotte | |
| 4,220,205 A | 9/1980 | Coursen et al. | |
| 4,342,911 A | 8/1982 | French | |
| 4,439,677 A | 3/1984 | Martin | |
| 4,471,435 A | 9/1984 | Meisner | |
| 4,722,220 A | 2/1988 | Herron | |
| 4,731,531 A | 3/1988 | Handke | |
| 4,879,181 A | 11/1989 | Fitzgibbon | |
| 4,926,940 A | 5/1990 | Stromswold | |
| 4,958,073 A | 9/1990 | Becker et al. | |
| 5,182,051 A | 1/1993 | Bandy et al. | |
| 5,243,190 A | 9/1993 | Bandy et al. | |
| 5,322,126 A | 6/1994 | Scott, III | |
| 5,413,179 A | 5/1995 | Scott, III | |
| 5,441,110 A | 8/1995 | Scott, III | |
| 5,442,173 A | 8/1995 | Wraight | |
| 5,572,021 A | 11/1996 | Heathman et al. | |

(Continued)

FOREIGN PATENT DOCUMENTS

EP    1355038    10/2003

(Continued)

OTHER PUBLICATIONS

"Scandium" retrieved from http://en.wikipedia.org/wiki/Scandium, Mar. 2, 2008.

(Continued)

*Primary Examiner* — Alicia Toscano

(57) ABSTRACT

Disclosed herein is a method comprising disposing in a formation fracture, a proppant and/or a fracturing fluid that comprises a radiation susceptible material that comprises indium and/or vanadium; irradiating the radiation susceptible material with neutrons; measuring gamma-radiation emitted from the radiation susceptible material in a single pass; wherein the single pass does not involve measuring of background radiation from previous or subsequent logging passes; and determining formation fracture height from the measured gamma-radiation.

18 Claims, 3 Drawing Sheets

U.S. PATENT DOCUMENTS

| | | | |
|---|---|---|---|
| 5,619,411 | A | 4/1997 | Smith |
| 5,783,822 | A | 7/1998 | Buchanan et al. |
| 5,847,384 | A | 12/1998 | Mathis |
| 5,921,317 | A | 7/1999 | Dewprashad et al. |
| 5,973,321 | A | 10/1999 | Schmidt |
| 6,632,527 | B1 | 10/2003 | McDaniel et al. |
| 6,649,682 | B1 * | 11/2003 | Breton et al. ............. 524/404 |
| 6,691,780 | B2 | 2/2004 | Nguyen et al. |
| 6,725,926 | B2 | 4/2004 | Nguyen et al. |
| 7,424,911 | B2 | 9/2008 | McCarthy et al. |
| 7,726,397 | B2 | 6/2010 | McDaniel et al. |
| 2003/0196799 | A1 | 10/2003 | Nguyen et al. |
| 2003/0196800 | A1 * | 10/2003 | Nguyen et al. ............. 166/254.1 |
| 2004/0129923 | A1 | 7/2004 | Nguyen et al. |
| 2004/0162224 | A1 | 8/2004 | Nguyen et al. |
| 2006/0102345 | A1 | 5/2006 | McCarthy et al. |
| 2007/0034373 | A1 | 2/2007 | McDaniel et al. |
| 2007/0199704 | A1 | 8/2007 | Hocking |
| 2007/0284518 | A1 | 12/2007 | Randall |
| 2008/0062036 | A1 | 3/2008 | Funk et al. |

FOREIGN PATENT DOCUMENTS

| | | |
|---|---|---|
| RU | 2002122743 | 3/2006 |
| WO | WO02/063341 | 8/2002 |
| WO | WO 2008/036982 | 3/2008 |

OTHER PUBLICATIONS

"It's Elemental" retrieved from http://education.jlab.org/itselemental/iso013.html, Oct. 14, 2008.

* cited by examiner

METHODS AND COMPOSITIONS FOR DETERMINATION OF FRACTURE GEOMETRY IN SUBTERRANEAN FORMATIONS

CROSS REFERENCE TO RELATED APPLICATIONS

This application is a divisional of U.S. patent application Ser. No. 11/501,575, filed Aug. 9, 2006 now U.S. Pat. No. 7,726,397, which application claims benefit to U.S. Provisional Application No. 60/706,791 filed Aug. 9, 2005, the entire contents of both applications are incorporated by reference herein.

FIELD OF THE INVENTION

This disclosure relates to methods and compositions for determining fracture geometry in subterranean formations.

BACKGROUND

The yield of hydrocarbons, such as gas and petroleum, from subterranean formations can be increased by fracturing the formation in order to stimulate the flow of these hydrocarbons in the formation. Various formation fracturing procedures are now used, such as, for example, hydraulic fracturing in which liquids, gases and or combinations of both are injected into the formation under high pressure (usually with propping agents).

Hydraulic fracturing is often used in the industry for improving oil and natural gas production from subterranean formations. During a hydraulic fracturing operation, a fluid, generally termed a "pad", is pumped down a well at sufficient pressure to fracture open the formation surrounding the well. Once a fracture has been created, the pumping of the pad, along with a slurry phase that comprises both the liquid and a proppant, is begun until a sufficient volume of the proppant has been carried by the slurry into the fracture. After a suitable time, the pumping operation is stopped at which time the proppant will prop open the fracture in the formation, thereby preventing it from closing. As a result of the fracture, trapped hydrocarbons are provided a more conductive pathway to the wellbore than was previously available, thereby increasing the well's production. In addition to creating deep-penetrating fractures, the fracturing process is useful in overcoming wellbore damage, to aid in secondary operations and to assist in the injection or disposal of produced formation brine water or industrial waste material.

During the fracturing process, the fractures propagate throughout the formation. The vertical propagation of these fractures is useful in determining the extent of fracture coverage as it relates to the producing interval. Fracture height measurements aid well operators in determining the success of the fracturing operation and, if necessary, to optimize future treatments, for other wells in the field. In addition, fracture height information can aid in the diagnosis of stimulation problems such as lower production rates or unfavorable water cuts. The fracture height data can indicate whether communication has been established between the producing formation and adjacent water or non-hydrocarbon producing formation zones. Height measurements also provide a check on the accuracy of fracture design simulators used prior to the job to predict fracture geometry. If excessive fracture height growth is determined this would imply that the fracture length is shorter than the designed value.

As previously stated, one reason for monitoring the vertical propagation of a fracture is the concern for fracturing outside of a defined hydrocarbon-producing zone into an adjacent water-producing zone. When this occurs, water will flow into the hydrocarbon-producing zone and the wellbore, resulting in a well that produces mainly water instead of the desired hydrocarbon. Furthermore, if there is still the desire to continue producing hydrocarbons from the well, operators must solve the serious problem of safely disposing of the undesired water. Addressing the problems arising from an out of zone fracture will also add expenses to the operations. In addition, if the fracture propagates into an adjacent non-hydrocarbon producing formation, the materials used to maintain a fracture after the fluid pressure has decreased may be wasted in areas outside the productive formation area. In short, it is expensive to save a well that has been fractured out of the hydrocarbon-producing zone.

Because of the serious problems that can occur as a result of out of zone fractures, it is desirable to determine formation fracture development. There are several techniques and devices used for monitoring and evaluating formation fracture development such as radioactive tracers in the fracturing fluid, temperature logs, borehole televiewers, passive acoustics and gamma-ray logging. Most techniques provide some direct estimates of fractured zone height at the wellbore.

One process used to determine formation fracture height development employs a radioactive tracer. In this process, a fracturing fluid containing a radioactive tracer is injected into the formation to create and extend the fractures. When these radioactive fluid and proppant tracers are used, post fracture gamma-ray logs have shown higher levels of activity opposite where the tracer was deposited, thereby enabling operators to estimate the development of the fractures.

Another approach for determining fracture height uses temperature and gamma-ray logs. Temperature logs made before and after stimulation are compared to define an interval cooled by injection of the fracturing fluid and thus provide an estimate of the fractured zone. However, this technique is subject to limitations and ambiguities. For example, the temperature log may be difficult to interpret because of low temperature contrast, flowback from the formation before and after the treatment, or fluid movement behind the borehole casing. In addition, the use of radioactive tracers gives rise to environmental problems such as the pollution of underground water streams, and the like, and hence is undesirable.

Other methods for evaluating fracture geometry comprise using a borehole televiewer or using acoustical methods. Utilizing a borehole televiewer is limited in that it can only be used for fracture height evaluation in open holes. In addition, utilizing a borehole televiewer is limited due to the extreme temperature and pressure conditions present in deeper completions. Acoustical methods are hampered by inhomogeneous formation impedance and/or the need for pumping while the tool is in the hole.

In addition to the problems associated with each type of monitoring, there are inherent problems in the formation fracturing technology. During the fracturing process, fracture fluid is generally pumped into the formation at high pressure, to force open the fractures, and an increasing proportion of sand is added to the fluid to prop open the resulting fractures. One problem with the existing technology is that the methods for determining whether a formation has been fractured out of the production zone relies on post-treatment (after the fracture has occurred) measurements. In such systems, a fracturing treatment is performed, the treatment is stopped, the well is tested and the data is analyzed. Moreover, with existing detection systems, the wait for post-fracturing data can take a considerable amount of time, even up to several days, which can delay the completion operations, resulting in higher personnel and operating costs.

Another problem associated with existing post-process "logging" or measuring devices is that the cost associated with interrupting a fracturing job in order to make a measurement of a fracture is neither practical nor feasible. Because the fracturing fluid is pumped into a formation under high pressures during the fracturing process, temporarily halting the pumping during the fracturing operation will result in the application of pressure to the fracturing fluid by the walls of the formation fracture. This could lead to undesirable results such as the closing of the fractures, thereby causing the reversal of fluid flow back into the borehole, or the build-up of sand in the hole. In addition, after taking measurements and completing the logging process, operators cannot restart the pumping equipment at the point of the fracturing process immediately before the interruption. Instead, the operators would have to repeat the complete fracturing job at additional cost and with unpredictable results.

A monitoring system could address the above-described problems and would allow well operators to monitor the fracturing process, to control fracture dimensions and to efficiently place higher concentrations of proppants in a desired formation location. In addition, if there is information that a fracture is close to extending outside the desired zone, operators can terminate the fracturing job immediately. Furthermore, analysis of the ongoing treatment procedure will enable an operator to determine when it is necessary to pump greater concentrations of the proppant, depending on factors such as the vertical and lateral proximity of oil/water contacts with respect to the wellbore, the presence or absence of water-producing formations and horizontal changes in the physical properties of the reservoir rock.

It is therefore advantageous to monitor fracture geometry using methods and compositions that are inexpensive, predictable and environmentally friendly.

SUMMARY

Disclosed herein is a method comprising disposing in a formation fracture, a proppant and/or a fracturing fluid that comprises a radiation susceptible material; and during a single logging pass irradiating the radiation susceptible material with neutrons; measuring gamma-radiation emitted from the radiation susceptible material; subtracting background radiation from peak energy radiation emanating from the indium and/or vanadium; and determining formation fracture height from the measured gamma-radiation.

Disclosed herein too is a proppant comprising a substrate; a coating disposed upon the substrate; wherein the substrate and/or the coating comprises a radiation susceptible material that comprises indium and/or vanadium.

Disclosed herein too is a proppant comprising a composite substrate comprising an organic or inorganic material; a filler dispersed therein; and a radiation susceptible material comprising vanadium and/or indium.

DETAILED DESCRIPTION OF FIGURES

DETAILED DESCRIPTION

Figure 1:
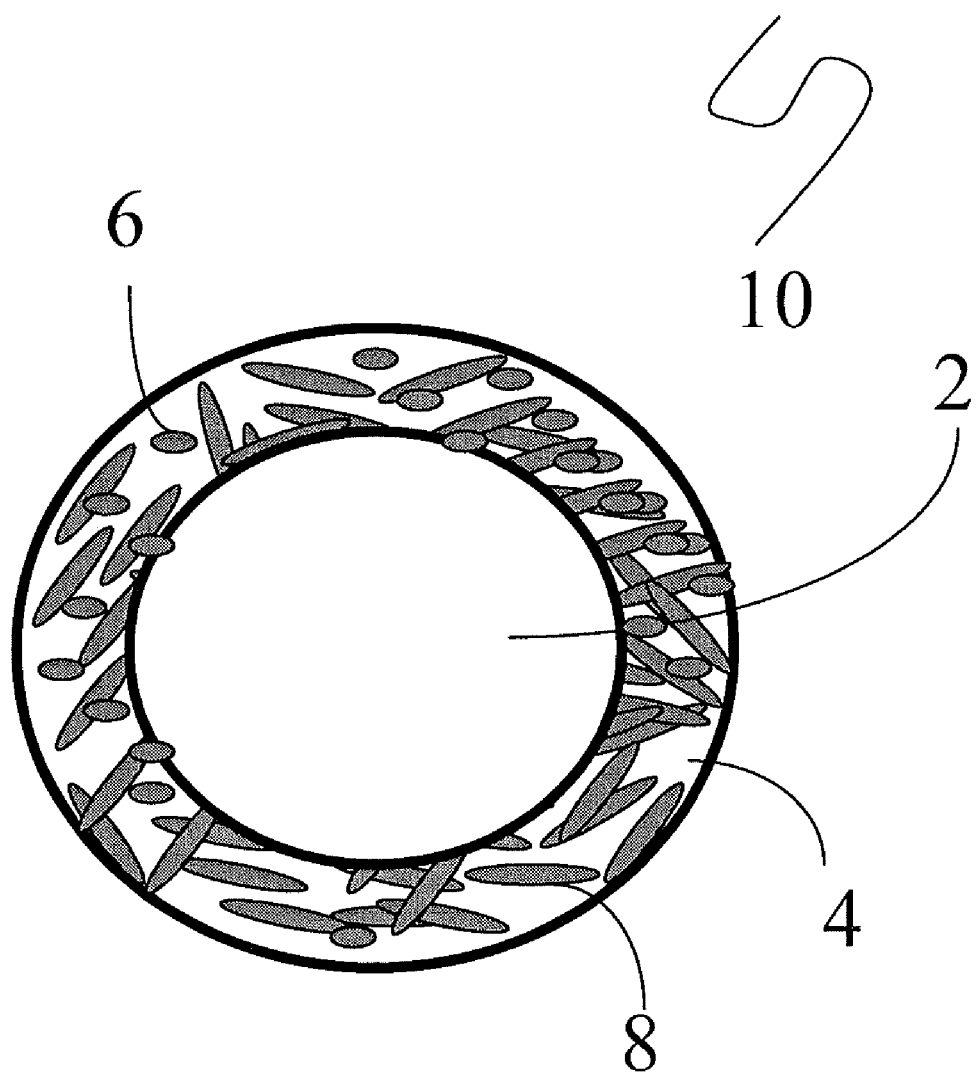
FIG. 1 depicts one exemplary embodiment of a proppant comprising a solid core upon which is disposed an organic coating that comprises the radiation susceptible material.

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Disclosed herein is a method for determining fracture geometry that uses environmentally friendly materials. These environmentally friendly materials are non-radioactive until bombarded by neutrons and will be referred to as radiation susceptible materials. In one embodiment, the method involves determining fracture geometry of a formation using target elements that comprise the radiation susceptible materials. The radiation susceptible materials have a short half-life, which advantageously permits them to be used in a formation while at the same time minimizing any adverse environmental impact, either from handling or having the proppant flow back out of the well after the well is put back on production.

As noted above, radiation susceptible materials as defined herein are those that become radioactive upon bombardment by neutrons. The radiation susceptible materials can advantageously be disposed in the fracturing fluid, or in a coating disposed upon a proppant that is disposed in the fracturing fluid or as a part of core of the proppant itself. The fracturing fluid or the proppant that comprises the radiation susceptible material can be used during a hydraulic fracturing treatment. The fracturing fluid and/or the proppants that comprise the radiation susceptible materials are injected into the fracture during the creation of the fracture. After being injected into the fracture, the radiation susceptible materials are irradiated with neutrons from a neutron source. Gamma radiation emitted from the radiation susceptible materials is detected by a logging tool. Since the radiation susceptible materials have a short half-life, these materials become radioactive for only a brief period of time. The location of the gamma radiation is used to determine the placement of the radiation susceptible materials in the fracture and is also used to determine the fracture geometry. In one embodiment, the location of the radiation susceptible materials is advantageously used to determine the fracture height.

The present method is advantageous in that background radiation acquired during the activation of the radiation susceptible materials can be collected in a single pass and subtracted from the peak energy radiation. All other commercially available processes generally use two or more logging passes to determine the fracture geometry of the fractured formation. The acquired background radiation generally comprises multiple contributions from a number of sources. A first contribution can generally be acquired from naturally occurring radioactive elements such as uranium, potassium, and/or thorium. Over time, fine-grained formations can trap minerals and fluids containing these naturally radioactive elements. When the radiation susceptible materials in the formation are activated by neutrons, these naturally occurring radioactive materials will also emit radiation, which is acquired as background radiation.

A second contribution to the background is acquired from radioactive tracers that were previously placed in the formation in order to determine fracture height. This second contribution is therefore derived from radioactive tracers that were placed in the formation in previous attempts that were made to determine the fracture geometry. A third contribution to the background is that induced by neutron radiation being presently used to activate the radiation susceptible materials. This radiation emanates mainly from aluminum and silicon present in the formation and/or the proppant. Background radiation from iron/manganese used in the wellbore casing may also be a part of this third contribution.

It is desirable to remove all traces of background radiation from the peak energy radiation prior to calculation of fracture geometry. In one embodiment, the peak energy radiation measurements as well as background radiation measurements are made in a single pass the background radiation measurements are subtracted from the peak energy radiation measurements in a single pass.

As noted above, the radiation susceptible materials can be disposed in a proppant that is introduced into the fracture to prop open the fracture. In one embodiment, the proppant can comprise a substrate upon which is disposed a coating comprising the radiation susceptible material. In another embodiment, the substrate can comprise the radiation susceptible material. When a proppant and/or fracturing fluid comprises a radiation susceptible material, it is said to be tagged with the radiation susceptible material. The term "tagging" as used herein implies that the proppant and/or the fracturing fluid comprises radiation susceptible materials. Thus, when a coating disposed on a substrate comprises radiation susceptible materials, the proppant is said to be tagged with a radiation susceptible material. The tagging of the proppants and/or the fluid with a radiation susceptible material permits photo-peak to photo-peak ratios to be generated upon activation of the radiation susceptible material. The photo-peak to photo-peak ratios provide measurements of the vertical height of a proppant filled fracture.

Figure 2:
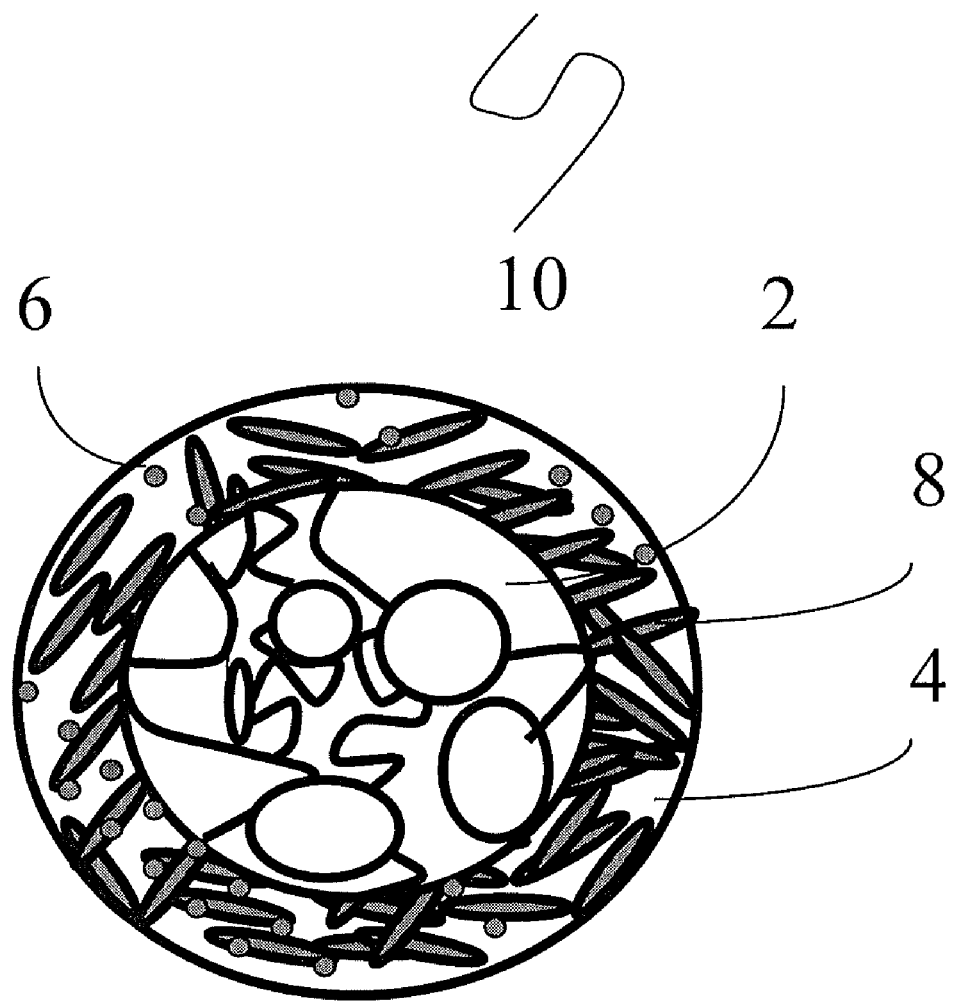
FIG. 2 depicts another exemplary embodiment of a proppant comprising a core made up of particulates upon which is disposed an organic coating that comprises the radiation susceptible material.

With reference now to FIG. 1 or FIG. 2, one exemplary embodiment of a proppant 10 comprises a substrate 2 upon which is disposed a coating 4 that comprises the radiation susceptible material 6. The coating 4 can comprise an organic or an inorganic material. The substrate 2 can comprise an organic material and/or an inorganic material and/or a metal. The coating 4 can be uncured, partially cured or fully cured prior to use in a subterranean fracture. This curing can occur either inside and/or outside the subterranean fracture.

The coating 4 can optionally comprise particulate fillers or fibrous fillers 8 if desired. The proppant 10 of FIGS. 1 and 2 comprises a metallic and/or inorganic substrate 2 that generally comprises a single particle or is an agglomerate comprising a plurality of particles. Examples of metals that can be used in the substrates are shape memory alloys. Shape memory alloys exhibit a "shape memory effect". The shape memory effect permits a reversible transformation between two crystalline states i.e., a martensitic state to an austenitic state and vice versa. Generally, in the low temperature, or martensitic state, shape memory alloys can be plastically deformed and upon exposure to some higher temperature will transform to an austenitic state, thereby returning to their shape prior to the deformation.

A suitable example of a shape memory alloy is a nickel titanium alloy such as NITINOL®. It is desirable for the shape memory alloys to be foamed. In one embodiment, a substrate manufactured from a shape memory alloy can be a solid prior to introduction into the fracture, but can expand into a foam after introduction into the fracture, which is generally at a higher temperature than the temperature above ground. This expansion will permit better conductivity of oil and gas from the fracture.

Examples of inorganic materials that can be used in the substrate are inorganic oxides, inorganic carbides, inorganic nitrides, inorganic hydroxides, inorganic oxides having hydroxide coatings, inorganic carbonitrides, inorganic oxynitrides, inorganic borides, inorganic borocarbides, or the like, or a combination comprising at least one of the foregoing inorganic materials. Examples of suitable inorganic materials are metal oxides, metal carbides, metal nitrides, metal hydroxides, metal oxides having hydroxide coatings, metal carbonitrides, metal oxynitrides, metal borides, metal borocarbides, or the like, or a combination comprising at least one of the foregoing inorganic materials. Metals used in the foregoing inorganic materials can be transition metals, alkali metals, alkaline earth metals, rare earth metals, or the like, or a combination comprising at least one of the foregoing metals.

Examples of suitable inorganic oxides that are synthetically produced include silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (e.g., FeO, a-$Fe_2O_3$, γ-$Fe_2O_3$, $Fe_3O_4$, or the like), calcium oxide (CaO), manganese dioxide ($MnO_2$ and $Mn_3O_4$), or combinations comprising at least one of the foregoing inorganic oxides. Examples of suitable synthetically produced inorganic carbides include silicon carbide (SiC), titanium carbide (TiC), tantalum carbide (TaC), tungsten carbide (WC), hafnium carbide (HfC), or the like, or a combination comprising at least one of the foregoing carbides. Examples of suitable synthetically produced nitrides include silicon nitrides ($Si_3N_4$), titanium nitride (TiN), or the like, or a combination comprising at least one of the foregoing. Exemplary inorganic substrates are those that comprise naturally occurring or synthetically prepared silica and/or alumina.

Examples of suitable naturally occurring inorganic materials that can be used in the substrate are silica (sand), aeschynite (rare earth yttrium titanium niobium oxide hydroxide), anatase (titanium oxide), bindheimite (lead antimony oxide hydroxide), bixbyite (manganese iron oxide), brookite (titanium oxide), chrysoberyl (beryllium aluminum oxide), columbite (iron manganese niobium tantalum oxide), corundum (aluminum oxide), cuprite (copper oxide), euxenite (rare earth yttrium niobium tantalum titanium oxide), fergusonite (rare earth iron titanium oxide), hausmannite (manganese oxide), hematite (iron oxide), ilmenite (iron titanium oxide), perovskite (calcium titanium oxide), periclase (magnesium oxide), polycrase (rare earth yttrium titanium niobium tantalum oxide), pseudobrookite (iron titanium oxide), members of the pyrochlore group such as, for example, betafite (rare earths calcium sodium uranium titanium niobium tantalum oxide hydroxide), microlite (calcium sodium tantalum oxide hydroxide fluoride), pyrochlore (sodium calcium niobium oxide hydroxide fluoride), or the like, or a combination comprising at least one of the foregoing pyrochlore group members; ramsdellite (manganese oxide), romanechite (hydrated barium manganese oxide), members of the rutile group, such as, for example, cassiterite (tin oxide), plattnerite (lead oxide), pyrolusite (manganese oxide), rutile (titanium oxide), stishovite (silicon oxide), or the like, or a combination comprising at least one of the foregoing rutile group members; samarskite-(Y) (rare earth yttrium iron titanium oxide), senarmontite (antimony oxide), members of the spinel group such as chromite (iron chromium oxide), franklinite (zinc manganese iron oxide), gahnite (zinc aluminum oxide), magnesiochromite (magnesium chromium oxide), magnetite (iron oxide), and spinel (magnesium aluminum oxide), or the like, or a combination comprising at least one of the foregoing spinel group members;

taaffeite (beryllium magnesium aluminum oxide), tantalite (iron manganese tantalum niobium oxide), tapiolite (iron manganese tantalum niobium oxide), uraninite (uranium oxide), valentinite (antimony oxide), zincite (zinc manganese oxide), hydroxides, such as, for example, brucite (magnesium hydroxide), gibbsite (aluminum hydroxide), goethite (iron oxide hydroxide), limonite (hydrated iron oxide hydroxide), manganite (manganese oxide hydroxide), psilomelane (barium manganese oxide hydroxide), romeite (calcium sodium iron manganese antimony titanium oxide hydroxide), stetefeldtite (silver antimony oxide hydroxide), stibiconite (antimony oxide hydroxide), or the like, or a combination comprising at least one of the foregoing naturally occurring inorganic materials.

Naturally occurring organic and inorganic materials that are subsequently modified can also be used as the substrate. Suitable examples of organic and inorganic materials that are modified and used in the substrate are exfoliated clays (e.g., expanded vermiculite), exfoliated graphite, blown glass or silica, hollow glass spheres, foamed glass spheres, cenospheres, foamed slag, sintered bauxite, sintered alumina, or the like, or a combination comprising one of the foregoing organic and inorganic materials. Exemplary inorganic substrates may be derived from sand, milled glass beads, sintered bauxite, sintered alumina, naturally occurring mineral fibers, such as zircon and mullite, or the like, or a combination comprising one of the naturally occurring inorganic substrates. Hollow glass spheres can be commercially obtained from Diversified Industries Ltd.

The organic materials that are used in the substrate can be thermoplastic polymers, thermosetting polymers, or a combination comprising a thermosetting polymer and a thermoplastic polymer. Examples of suitable organic materials that can be used as the substrate are polymer precursors (e.g., low molecular weight species such as monomers, dimers, trimers, or the like), oligomers, polymers, copolymers such as block copolymers, star block copolymers, terpolymers, random copolymers, alternating copolymers, graft copolymers, or the like; dendrimers, ionomers, or the like, or a combination comprising at least one of the foregoing. When the substrate comprises a thermosetting polymer, it is desirable for the organic materials to undergo curing (crosslinking) upon the application of either thermal energy, electromagnetic radiation, or a combination comprising at least one of the foregoing. Initiators may be used to induce the curing. Other additives that promote or control curing such as accelerators, inhibitors, or the like, can also be used.

Examples of suitable thermosetting polymers for use in the substrate are epoxies, acrylate resins, methacrylate resins, phenol-formaldehydes, epoxy-modified novolacs, furans, urea-aldehydes, melamine-aldehydes, polyester resins, alkyd resins, phenol formaldehyde novolacs, phenol formaldehyde resoles, phenol-aldehydes, resole and novolac resins, epoxy modified phenolics, polyacetals, polysiloxanes, polyurethanes, or the like, or a combination comprising at least one of the foregoing thermosetting polymers.

Epoxy-modified novolacs are disclosed by U.S. Pat. No. 4,923,714 to Gibb et al. incorporated herein by reference. The phenolic portion can comprise a phenolic novolac polymer; a phenolic resole polymer; a combination of a phenolic novolac polymer and a phenolic resole polymer; a cured combination of phenolic/furan or a furan resin to form a precured resin (as disclosed by U.S. Pat. No. 4,694,905 to Armbruster incorporated herein by reference); or a curable furan/phenolic resin system curable in the presence of a strong acid to form a curable resin (as disclosed by U.S. Pat. No. 4,785,884 to Armbruster). The phenolics of the above-mentioned novolac or resole polymers may be phenol moieties or bis-phenol moieties.

The thermosets can be cold setting resins. Cold setting resins are those that can react at room temperature without the use of additional heat. Cold set resins generally cure at a temperature less than 65° C. Thus, for example, a thermosets that cures at 80° C., is not a cold setting resins. Examples of suitable cold setting resins include epoxies cured with an amine when used alone or with a polyurethane, polyurethanes, alkaline modified resoles set by esters (e.g., ALPHASET® and BETASET®), furans, e.g., furfuryl alcohol-formaldehyde, urea-formaldehyde, and free methylol-containing melamines set with acid. For the purposes of this description, a cold set resin is any resin that can normally be cured at room temperature. ALPHASET® and BETASET® resins are ester cured phenolics.

Urethanes are disclosed by U.S. Pat. No. 5,733,952 to Geoffrey. Melamine resins are disclosed by U.S. Pat. Nos. 5,952,440, 5,916,966, and 5,296,584 to Walisser. ALPHASET resins are disclosed by U.S. Pat. Nos. 4,426,467 and Re. 32,812 (which is a reissue of U.S. Pat. No. 4,474,904) all of which are incorporated herein by reference.

Modified resoles are disclosed by U.S. Pat. No. 5,218,038, incorporated herein by reference in its entirety. Such modified resoles are prepared by reacting aldehyde with a blend of unsubstituted phenol and at least one phenolic material selected from the group consisting of arylphenol, alkylphenol, alkoxyphenol, and aryloxyphenol. Modified resoles include alkoxy modified resoles. An exemplary alkoxy modified resole is a methoxy modified resoles. An exemplary phenolic resole is the modified orthobenzylic ether-containing resole prepared by the reaction of a phenol and an aldehyde in the presence of an aliphatic hydroxy compound containing two or more hydroxy groups per molecule. In one exemplary modification of the process, the reaction is also carried out in the presence of a monohydric alcohol.

Examples of suitable thermoplastic polymers that can be used in the substrate are polyolefins, polyacrylics, polycarbonates, polyalkyds, polystyrenes, polyesters, polyamides, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, phenolics, epoxies, or combinations comprising at least one of the foregoing thermoplastic materials.

Naturally occurring organic substrates are ground or crushed nut shells, ground or crushed seed shells, ground or crushed fruit pits, processed wood, ground or crushed animal bones, or the like, or a combination comprising at least one of the naturally occurring organic substrates. Examples of suitable ground or crushed shells are shells of nuts such as walnut, pecan, almond, ivory nut, brazil nut, ground nut (peanuts), pine nut, cashew nut, sunflower seed, Filbert nuts (hazel nuts), macadamia nuts, soy nuts, pistachio nuts, pumpkin seed, or the like, or a combination comprising at least one of the foregoing nuts. Examples of suitable ground or crushed seed shells (including fruit pits) are seeds of fruits such as plum, peach, cherry, apricot, olive, mango, jackfruit, guava, custard apples, pomegranates, watermelon, ground or crushed seed shells of other plants such as maize (e.g., corn cobs or corn kernels), wheat, rice, jowar, or the like, or a combination comprising one of the foregoing processed wood materials such as, for example, those derived from woods such as oak, hickory, walnut, poplar, mahogany, including such woods that have been processed by grinding, chipping, or other form of particalization. An exemplary naturally occurring substrate is a ground olive pit.

The substrates can have any desired shape such as spherical, ellipsoidal, cubical, polygonal, or the like. It is generally desirable for the substrates to be spherical in shape. The substrates can have average particle sizes of about 100 micrometers to about 1200 micrometers. In one embodiment, the substrates can have average particle sizes of about 300 micrometers to about 600 micrometers. In another embodiment, the substrates can have average particle sizes of about 400 micrometers to about 500 micrometers.

When a substrate is a porous substrate, it is envisioned that the substrate can comprise particles that are agglomerated to form the particulate substrate. In such a case, the individual particles that combine to form the substrate can have average particle sizes of about 2 to about 30 micrometers. In one embodiment, the particles that agglomerate to form the substrate may have average particle sizes of less than or equal to about 28 micrometers. In another embodiment, the particles that agglomerate to form the substrate may have average particle sizes of less than or equal to about 25 micrometers. In yet another embodiment, the particles that agglomerate to form the substrate may have average particle sizes of less than or equal to about 20 micrometers. In yet another embodiment, the particles that agglomerate to form the substrate may have average particle sizes of less than or equal to about 15 micrometers. Bimodal or higher particle size distributions may be used. Exemplary substrates are spherical in shape.

Porous substrates generally have high surface areas. If the substrate is porous, it is desirable for the substrate to have a surface area of greater than or equal to about 10 square meters per gram ($m^2/gm$). In one embodiment, it is desirable for the substrate to have a surface area of greater than or equal to about 100 $m^2/gm$. In another embodiment, it is desirable for the substrate to have a surface area of greater than or equal to about 300 $m^2/gm$. In yet another embodiment, it is desirable for the substrate to have a surface area of greater than or equal to about 500 $m^2/gm$. In yet another embodiment, it is desirable for the substrate to have a surface area of greater than or equal to about 800 $m^2/gm$.

The density of the substrate can be chosen depending upon the application for which the proppant is being used. It is desirable to choose substrates that can impart to the proppant an apparent density of 0.5 to 4 grams per cubic centimeter (g/cc). The apparent density is defined as the density of the entire proppant (i.e., the weight per unit volume of the entire material including voids inherent in the proppant).

As noted above, in FIGS. 1 and 2, the substrate has disposed upon it a coating. The coating can be an organic coating, an inorganic coating, or a coating comprising at least one of the foregoing coatings and comprises the radiation susceptible material. Exemplary organic coatings can be derived from the thermoplastic and thermosetting polymers listed above.

The radiation susceptible material that is included in the coating on the substrate or in the substrate of the proppant is neutron-responsive so that it readily reacts to neutrons, such as by absorbing thermal neutrons to exhibit a relatively large atomic cross section. By such responsiveness to neutrons, the radiation susceptible material yields the characteristic gamma radiation or neutron absorption, which is distinguishable from the characteristics of the materials in the surrounding formation. These radiation susceptible materials are also initially non-radioactive so that they can be safely handled without fear or risk of radiation exposure or contamination at the surface of the well until after it is introduced into the system by which it is to be moved into the well.

Although the radiation susceptible material is initially non-radioactive, the isotope of the radiation susceptible material is one which either becomes radioactive, whereby the created radioactive isotope decays and emits gamma radiation detectable by a suitable detector, or otherwise undergoes a nuclear or atomic reaction, such as by simply absorbing one or more neutrons to an extent greater than the materials of the surrounding formation. Such a reaction can occur in response to the external neutrons emitted from an accelerator. If the original substance is to react by forming a radioactive isotope, the radioactive isotope preferably has a known half-life of between approximately a few seconds and up to about 30 minutes so that prolonged irradiation by the accelerator is not needed for the reaction to occur and so that adequate detection time exists once the conversion has occurred. It is advantageous that the susceptible material decays to a non radioactive state shortly after the logging process is completed, thereby allowing the well to be brought back into production without fear of producing radioactive material.

In one embodiment, the radiation susceptible materials have a half-life of about 5 seconds to less than or equal to about 100 days. In another embodiment, the radiation susceptible materials have a half-life of about 10 seconds to less than or equal to about 50 minutes. In yet another embodiment, the radiation susceptible materials have a half-life of about 12 seconds to less than or equal to about 7 minutes. An exemplary half-life for a radiation susceptible material is less than or equal to about 5 minutes. Vanadium has a half-life of 3.8 minutes, while indium has a half-life of 14.1 seconds. It is generally desirable for the period of measurable radiation to be of a length so that the material no longer emits radiation when the well starts producing hydrocarbons. In general, it is desirable for the radiation susceptible material to stop emitting measurable radiation before it is placed back on production. It is also advantageous in that after the half-life of the radiation susceptible material has expired, the well can be re-logged as many times as desired by re-irradiating the radiation susceptible material.

As noted above, the radiation susceptible materials can comprise vanadium and/or indium or combinations comprising at least one of the foregoing radiation susceptible materials. The radiation susceptible materials may comprise vanadium and/or indium in all available forms. These forms may include metals, alloys, salts, composites, suspensions, or the like. Vanadium and indium are useful because they have very strong responses in their natural states. In one embodiment, the vanadium and/or indium metal particles are dispersed in the organic and/or inorganic material prior to coating the substrate. In another embodiment, salts of vanadium and/or indium can be dispersed in the organic and/or inorganic material prior to coating the substrate.

Exemplary vanadium salts that can be used as radiation susceptible materials are vanadyl sulfate, sodium or potassium orthovanadate, sodium or potassium metavanadate, chloride salts of vanadium, or the like, or a combination comprising at least one of the foregoing vanadium salts. Other compounds comprising vanadium can also be used. Examples of vanadium compounds that can be used are vanadium oxides, such as, for example, vanadium trioxide, vanadium pentoxide, or the like, or a combination comprising at least one of the foregoing oxides. Other examples of vanadium compounds, which can be used alone or in combination with each other, include vanadium metal, vanadium alloys such as vanadium/aluminum alloys, ferrovanadium, or a vanadium carbon nitride powder such as NITROVAN vanadium, which is commercially available from Stratcor, Inc., Pittsburgh Pa.

Exemplary indium salts are indium chloride, indium sulfate, or the like, or a combination comprising at least one of the foregoing indium salts. In one embodiment, salts of indium or vanadium can be dispersed in the proppant coating and can be reacted to form a metal after the proppant is introduced into the formation.

When radiation susceptible materials such as vanadium and/or indium salts and/or compounds are used in the coatings, they are used in amounts of up to about 55 wt %, based on the total weight of the proppant. In one embodiment, the radiation susceptible materials are used in amounts of up to about 25 wt %, based on the total weight of the proppant. In another embodiment, the radiation susceptible materials are used in amounts of up to about 15 wt %, based on the total weight of the proppant. In yet another embodiment, the radiation susceptible materials can be used in amounts of up to 5 wt %, based on the weight of the proppant. The radiation susceptible materials can be used in amounts of as low as 0.01 wt %, based on the total weight of the proppant.

In another embodiment, when radiation susceptible materials such as vanadium metal, salts and/or compounds are utilized in the proppant and/or the fracturing fluid, they are used in amounts up to about 0.3 wt % as vanadium metal, preferably 0.01 to 5 wt %, preferably 0.05 to 2 wt % and more preferably 0.1 to 1 wt %, based on the total weight of the proppant. In a preferred embodiment, the vanadium compound is a vanadium carbon nitride powder or NITROVAN vanadium, having a particle size of about 1-15 microns, preferably 1 to 10 microns and more preferably 2-5 microns. In another preferred embodiment, the vanadium compound is a vanadium carbon nitride powder or NITROVAN vanadium, of 0.01 to 5 wt % as vanadium metal, preferably 0.05 to 2 wt % and more preferably 0.1 to 1 wt %, based on the total weight of the proppant.

In addition to vanadium and/or indium, other radiation susceptible materials may also be added to the coating. Examples of suitable radiation susceptible materials that may be added to the proppant and/or the fracturing fluid in addition to the vanadium and/or the indium can include iridium 191, iridium 193, cadmium 113, dysprosium, europium, lutetium, manganese, gold, holmium, rhenium, samarium, tungsten, or the like, or a combination comprising at least one of the foregoing materials.

Figure 3:
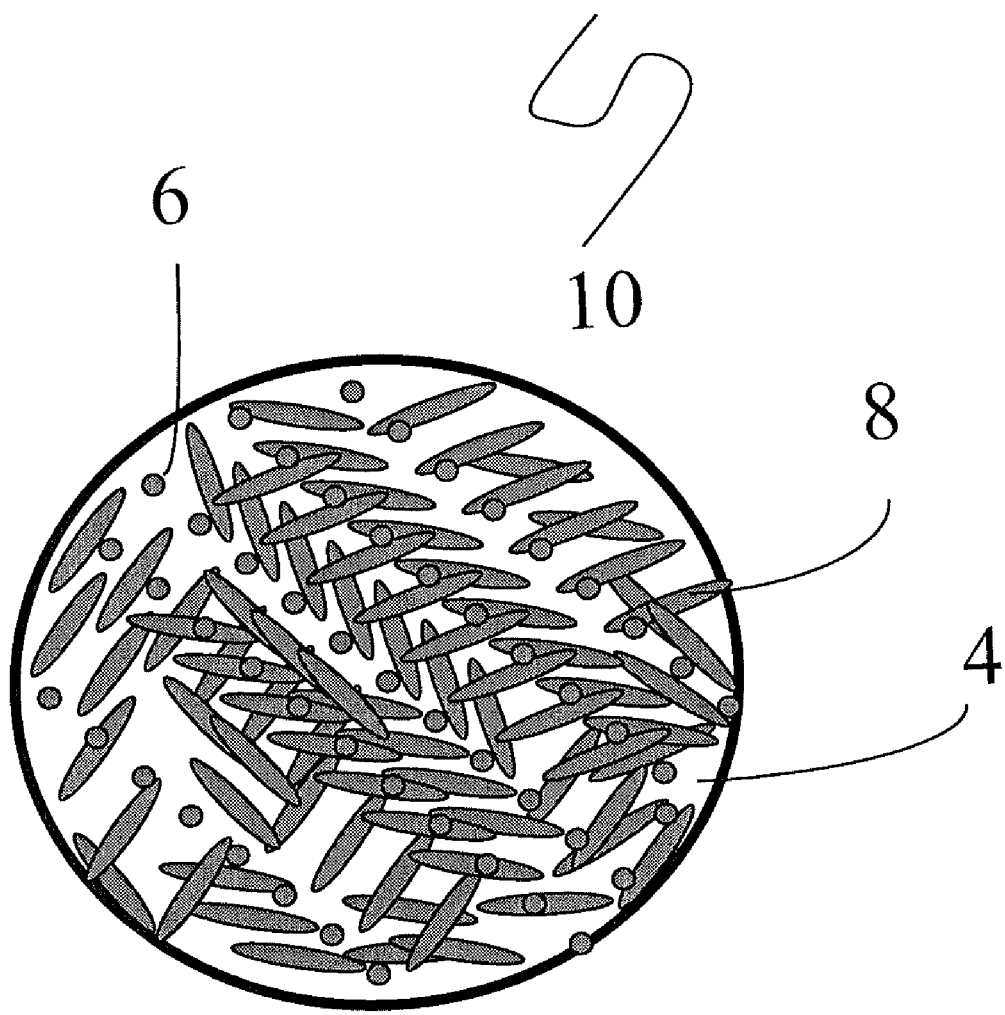
FIG. 3 depicts another exemplary embodiment of a proppant that comprises an organic material in which is dispersed a filler and the radiation susceptible material.

In one embodiment as depicted in FIG. 3, the substrate can comprise a composite of inorganic and organic materials. Such a substrate is termed a composite substrate. The composite substrate can comprise a combination of inorganic and organic materials. The organic materials can also be chemically bonded to the inorganic materials. Chemical bonding comprises covalent bonding, hydrogen bonding, ionic bonding, or the like. An example of a suitable reaction between an organic and an inorganic material that involves covalent bonding is a sol-gel reaction. The chemical bonding between the organic and inorganic materials can result in substrates that are nanocomposites. Composite substrates can be optionally coated with the organic coatings and/or the inorganic coatings described above.

In one embodiment, the composite substrate can also comprise radiation susceptible materials. In another embodiment, the radiation susceptible material is introduced during the manufacture of the substrate, in particular, in the manufacture of a ceramic substrate. In another embodiment, when the composite substrate is coated with an organic coating and/or an inorganic coating, both the composite substrate and the coating disposed thereon can comprise radiation susceptible materials.

The composite substrate can comprise radiation susceptible materials in an amount of up to about 35 wt %, based on the total weight of the proppant. An exemplary amount of the radiation susceptible materials is about 5 wt %, based on the total weight of the proppant.

In one embodiment, proppants comprising the radiation susceptible material can be mixed with proppants that are free from any radiation susceptible material prior to introduction into the fracture. The mixture of proppants comprising the radiation susceptible material with proppants that are free from any radiation susceptible material is termed a "proppant composition". A proppant composition generally will contain radiation susceptible materials in an amount of up to 55 wt %, based on the total weight of the proppant composition. An exemplary amount of radiation susceptible materials in the proppant composition is about 5 to about 10 wt % and preferably about 0.01 to about 5 wt %, based on the total weight of the proppant composition.

In another embodiment, proppants comprising different radiation susceptible materials can be mixed. For example, a first proppant can comprise a first radiation susceptible material, while a second proppant can comprise a second radiation susceptible material. For example, the first proppant can include a certain vanadium containing compound, while the second proppant includes a different vanadium containing compound or an indium containing compound.

As noted above, the substrate can be solid (i.e., without any substantial porosity) or porous if desired. In general, a porous substrate permits for impregnation by an organic material, thereby imparting to the substrate an ability to flex and to absorb shock and stress without deforming. The ability of a polymer to impregnate the substrate also minimizes the ability of the proppant to fracture, thereby reducing dust generation. By impregnating a porous inorganic substrate with an organic material, the density of the proppant can be adjusted to suit various fracture conditions. In general, the substrate can have a porosity of greater than or equal to about 20%, based on the total volume of the substrate. In one embodiment, the substrate can have a porosity of greater than or equal to about 50%, based on the total volume of the substrate. In another embodiment, the substrate can have a porosity of greater than or equal to about 70%, based on the total volume of the substrate. In yet another embodiment, the substrate can have a porosity of greater than or equal to about 90%, based on the total volume of the substrate.

The substrates can be present in the proppants in an amount of about 10 to about 90 weight percent (wt %), based on the total weight of the proppants. In one embodiment, the substrates are present in an amount of about 20 to about 80 wt %, based on the total weight of the proppants. In another embodiment, the substrates are present in the reactive solution in an amount of about 30 to about 75 wt %, based on the total weight of the proppants. In yet another embodiment, the substrates are present in an amount of about 35 to about 65 wt %, based on the total weight of the proppants.

In another embodiment, the radiation susceptible materials can be present in the fracturing fluid but not in the proppants. When the radiation susceptible material is present in the fracturing fluid, it can be present in the form of suspended colloidal particles or it can be dissolved in the fracturing fluid. The fracturing fluid can comprise radiation susceptible materials in an amount of about 0.01 wt % to about 35 wt %, based on the total weight of the fracturing fluid. In one embodiment, the fracturing fluid can comprise radiation susceptible materials in an amount of about 2 wt % to about 25 wt %, based on the total weight of the fracturing fluid. In yet another embodiment, the fracturing fluid can comprise radiation susceptible materials in an amount of about 3 wt % to about 15 wt %, based on the total weight of the fracturing fluid. An exemplary amount of the radiation susceptible materials is about 5 wt %, based on the total weight of the fracturing fluid.

In yet another embodiment, both the fracturing fluid and the proppants contained in the fracturing fluid can comprise the radiation susceptible materials. In one embodiment, the fracturing fluid and the proppants can both contain the same cations. For example, the fracturing fluid can comprise dissolved vanadyl sulfate, while the proppants contained in the fracturing fluid can comprise vanadium trioxide. Upon being subjected to neutrons, both the vanadyl sulfate and the vanadium trioxide can emit gamma radiation that can be used to calculate the fracture geometry.

In yet another embodiment, the fracturing fluid and the proppants contained in the fracturing fluid can comprise different cations. For example, the fracturing fluid can comprise a first radiation susceptible material, while the proppants contained in the fracturing fluid can comprise a second radiation susceptible material. For example, the fracturing fluid can comprise vanadyl sulfate, while the proppants can comprise a salt of indium. In a related embodiment, the fracturing fluid can comprise a salt of a radiation susceptible material, while the proppant can comprise a radiation susceptible material that comprises metal particles. For example, the fracturing fluid can comprise vanadyl sulfate while the proppant can comprise particles of indium.

A suitable spectral gamma-ray tool or sonde may be utilized to measure the gamma radiation obtained from the radiation susceptible material after it is bombarded by neutrons. At least a portion of the tool, e.g., at least the gamma-ray detector, is placed within the well to provide the desired log. The tool can be such as to generate the desired ratios downhole, or the gamma-ray spectra can be transmitted to the surface and the ratios determined from the spectral data. Either a low resolution, e.g., NaI(Tl) or equivalent, detector or a high resolution, e.g., intrinsic germanium, Ge(Li) or equivalent detector can be used. Since it is desirable to obtain a precise measurement of the peak area or areas a high-resolution instrument is generally used. Logs can be generated either in a continuous, moving tool mode, or in a stationary mode in which the tool is stopped at selected locations in the borehole.

A collimator can be used on the detector if desired. In one embodiment, a rotating collimator is used to measure fracture orientation. Such collimators tend to increase the sensitivity of the measurement since such devices reduce the number of gamma rays entering the detector from locations up or down the borehole, i.e., gamma rays from proppant that is behind the casing but is above or below the current location of the detector. In one embodiment, a detector without a collimator can be used.

In one embodiment, in one method of determining fracture height, tagged proppants and/or a tagged fracturing fluid are introduced into the formation. The tagged proppants and/or tagged fracturing fluid generally comprise indium and/or vanadium. The tagged proppant and/or tagged fracturing fluid is then bombarded with neutrons during a logging pass. A logging pass is one wherein the logging tool is introduced into the well and wherein a neutron bombardment of the formation fracture is initiated. Gamma ray spectroscopy is then performed on the irradiated indium and vanadium to obtain gamma count rates both above and below the peak energies (also referred to as off-peak energies) coming from vanadium and/or indium. Gamma count rates are measured at the peak energies for indium and/or vanadium as well. The off-peak measurements are used to remove a portion of background radiation from the peak energies. The background removal is accomplished using spectroscopy software routines.

Additional background radiation emanating from the presence of materials such as aluminum, silicon, iron, or the like, is also removed prior to obtaining the peak energies for the indium and/or vanadium that is injected into the fracture. Materials such as aluminum, silicon, iron, or the like, are generally present in the formation and in the well-bore casing and also generate gamma radiation due to the neutron bombardment. Removal (subtraction) of this contribution to background radiation along with the off-peak energy radiation generally leaves the peak energies of the injected indium and vanadium. These peak energies can be used to estimate the geometry of the fracture. In an exemplary embodiment, the peak energy positions of the injected indium and/or vanadium can be used to determine the fracture height.

In one method of estimating the radiation due to materials such as aluminum, silicon, iron, or the like, the formation fracture is irradiated with neutrons during a single logging pass. During this pass, gamma ray spectroscopy of the entire spectrum of energies is performed. After the logging pass, all of the radiation due to materials having a short half-life such as that from the vanadium and/or indium, will die out, leaving behind radiation emanating from those elements that are naturally present in the fractured formation.

In order to measure the fracture height in a single pass, it is desirable to obtain gamma ray measurements that cover the entire spectrum of energies of the gamma rays emitted by the vanadium and/or the indium as well as other materials that are naturally present in the fractured formation. The radiation measurements are made by using a detector present in the logging tool. As noted above, measurements obtained at off-peak energies are subtracted from the measurements made at peak energies to remove the background radiation. This background radiation involves radiation signals that are obtained from the activation of nuclei that are generally present in formations such as aluminum, silicon iron, or the like. It is to be noted that some radiation may also emanate from materials used in the well-bore casing and these are to be removed. This background radiation from materials present in the well-bore and formation is generated because of the exposure to neutrons in a manner similar to that coming from the vanadium and/or indium that are injected into the formation fracture. After the logging pass, the radiation emanating from the activation of vanadium and/or indium will die out because of the short half-life of these materials leaving the natural background radiation from materials such as aluminum, silicon, iron, or the like, present in the earth formations. This background radiation can then be measured and subtracted from the measured peak energies of the indium and/or vanadium to estimate the fracture height.

In another embodiment, in another method of determining fracture height, tagged proppants having differing densities can be introduced into the formation. Gravitational separation of the tagged proppants can then be used to determine the fracture geometry. The heavier tagged proppants will settle to the bottom of the fracture, while the lighter proppants will float to the top of the fracture. In one embodiment, the proppants having the higher densities can be tagged with a first radiation susceptible material, while the proppants having the lighter densities can be tagged with a second radiation susceptible material. Gamma radiation signals obtained from the tagged proppants can then be used to determine the height and other geometrical features of the fracture. For example, if the denser proppants comprise vanadium and the lighter proppants comprise indium, then the gamma radiation signals from the vanadium and those from the indium can be used to determine the height of the fracture.

In yet another embodiment, in another method of determining fracture height, tagged proppants that are capable of being oriented can be used to determine fracture height. The proppant can comprise an active material in addition to the radiation susceptible material, wherein the active material can be used to orient the proppant. The active material that promotes orientation in the proppant can be activated by an external activating signal such as, for example, radio signals, electrical fields, magnetic fields, ultrasonic signals, or the like. In one embodiment, the tagged proppant can comprise electrically conductive particles such as for example, conductive metal particles, carbon nanotubes, or the like, which permit the proppant to be realigned by an applied electrical field. Thus, after the tagged proppants are introduced into the formation, the active materials can be activated by the application of the appropriate external activating signal to promote reorientation. After the desired orientation is achieved, the tagged proppants are bombarded with neutrons to produce gamma-rays. The measured gamma-rays are correlated with the orientation to derive information about the fracture geometry. When tagged proppants are capable of being oriented, the logging tool can comprise an apparatus that is capable of orienting the suspended particles as well as measuring the resulting orientation in the tagged particles.

This method is advantageous since it uses a single pass of the logging tool to determine the fracture height. After irradiation, the radiation susceptible material can be left downhole because of its extremely short half-life. This permits re-determining the fracture geometry after substantial intervals of time after the fracturing has occurred. For example, a determination of fracture geometry can be initially made as soon as the fracturing occurs. Since the radiation susceptible materials can be retained in the formation without any damage to the soil or underground water or to personnel above ground, another determination of fracture geometry can be made after an interval of several months to observe changes in the fracture.

Other methods generally require two or more passes of the logging tool to determine the fracture height. The present method is also advantageous in that it prevents contamination of the soil and underground water with radioactive materials. Since the radiation susceptible materials used in the present method have a short half-life, contamination of underground water streams and soil can be prevented. In addition, if flow back from the well occurs, then the risk of personnel being subjected to radiation is substantially reduced.

This method also avoids the use of radioactive tracers. The use of radioactive tracers generally contaminates underground water streams and is environmentally hazardous. Other methods that use radioactive tracers must perform a background-logging pass to remove the natural gamma radiation coming from the materials present in the formations. This background removal is most critical when either the injected radioactive material is dying out, and/or when this material was poorly positioned, and/or when this material was positioned deeply into the formation making it difficult to find.

In order to provide a better understanding of the present invention including representative advantages thereof, the following examples are offered. It is understood that the examples are for illustrative purposes and should not be regarded as limiting the scope of the invention to any specific materials or conditions.

EXAMPLES

A pre-cured resin coating was developed by pre-mixing a solution of 70 grams of Oilwell resin 262E is a liquid phenol-formaldehyde resole resin, and (3.75 grams of 80%) or (6.0 grams of 50%) of a Vanadium alloy compound. The pre-mixed solution was then added to 1 kilogram fracturing substrate pre-heated to a temperature between 380 to 400° F. (193 to 204° C.). The substrate and pre-mixed solution were then mixed together with constant agitation. A surfactant (Chembetaine) was added at 2 minutes, 30 seconds into the cycle. Agitation was stopped at 3 minutes, 40 seconds and the coated material was placed into an oven pre-heated to 320° F. (160° C.) for a post bake of 3 minutes, 40 seconds. The coated material was then removed from the oven and cooled to room temperature.

Using the procedure above, a number of vanadium alloy compounds (with varying particle sizes) were prepared for further testing. The results appear in Table 1.

TABLE 1

| Vanadium Alloy Compound | Particle Size[1] | % Concentration of V on Substrate[2] | Substrate Mesh Size[3] | % Loss on Ignition[4] | Crush Resistance (wt % fines)[5] |
|---|---|---|---|---|---|
| 80% Ferrovanadium alloy | ~40 micron | 0.211 | 20/40 | 3.90 | 9.4 |
| 50% Aluminum vanadium alloy | ~10 micron | 0.305 | 20/40 | | |
| 80% Vanadium nitride/carbide | ~3 micron | | 20/40 | 3.82 | 12.8 |
| 80% Vanadium nitride/carbide | ~3 micron | 0.255 | 40/70 | 3.73 | 2.3 |

[1]Particle size as determined by a Coulter Particle Size Analyzer
[2]Metals Analysis as determined by Atomic Absorption by Acid Digestion
[3]Substrate Particle Mesh Size as determined by API (American Petroleum Institute) RP-56, section 4
[4]Loss on Ignition wherein sample is ashed at 1700° F. (927° C.) for 2 hours and weight loss recorded
[5]Crush Resistance as determined by API RP-56, section 8:

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A proppant, comprising:
   a substrate; and
   a coating disposed upon the substrate, wherein the coating comprises a radiation susceptible material comprising vanadium carbon nitride powder, and wherein the radiation susceptible material is non-radioactive until bombarded by neutrons.

2. The proppant of claim 1, wherein the coating comprises an organic coating, an inorganic coating, or a combination thereof.

3. The proppant of claim 1, wherein, after being irradiated, the radiation susceptible material has a half-life of about 10 seconds to about 50 minutes.

4. The proppant of claim 1, wherein the proppant comprises 0.01 wt % to about 35 wt % weight percent radiation susceptible material.

5. The proppant of claim 1, wherein the substrate comprises an organic particle having a filler dispersed therein.

6. The proppant of claim 1, wherein the radiation susceptible material selected from the group consisting of vanadium metal, a ferrovanadium alloy, an aluminum vanadium alloy, further comprises a material and combinations thereof.

7. The proppant of claim 1 wherein the vanadium carbon nitride powder has a particle size of about 1-15 microns and wherein the amount of vanadium carbon nitride powder comprises 0.01 to 5 wt % as vanadium metal, based on the total weight of the proppant.

8. The proppant of claim 2, wherein the coating comprises a polymerized epoxy, a polyacrylate, a polymethacrylate, a polymerized phenol-formaldehyde, a polymerized epoxy-modified novolac, a polymerized furan, a polymerized urea-aldehyde, a polymerized melamine-aldehyde, a polyester, a polyalkyd, a polymerized phenol formaldehyde novolac, a polymerized phenol formaldehyde resole, a polymerized phenol-aldehyde, a polymerized resole, a polymerized novolac, a polymerized epoxy modified phenolic, a polymerized urethane resin, polysiloxanes, or a combination comprising at least one of the foregoing.

9. The proppant of claim 1, wherein the radiation susceptible material further comprises a vanadium material selected from the group consisting of vanadium metal, a vanadium alloy, a vanadium salt, a vanadium composite, a vanadium suspension, and combinations thereof.

10. The proppant of claim 1, wherein the radiation susceptible material further comprises a vanadium material selected from the group consisting of vanadyl sulfate, vanadyl sodium, vanadyl potassium orthovanadate, sodium metavanadate, potassium metavanadate, chloride salts of vanadium, vanadium trioxide, vanadium pentoxide, and combinations thereof.

11. The proppant of claim 1, wherein the proppant comprises about 0.01 to 5 wt % of vanadium carbon nitride powder.

12. The proppant of claim 1, wherein the radiation susceptible material further comprises a material selected from the group consisting of iridium 191, iridium 193, cadmium 113, dysprosium, europium, lutetium, manganese, gold, holmium, rhenium, samarium, tungsten, and combinations thereof.

13. A fracturing fluid comprising the proppant of claim 1.

14. A fracturing fluid, comprising:
   a first radiation susceptible material, wherein the first radiation susceptible material is non-radioactive until bombarded by neutrons, and a proppant comprising a substrate and a coating disposed upon the substrate, wherein the coating comprises a second radiation susceptible material, wherein the second radiation susceptible material comprises vanadium carbon nitride powder.

15. The fracturing fluid of claim 14, wherein the first radiation susceptible material is in the form selected from the group consisting of suspended colloidal particles, dissolved material in the fracturing fluid, and combinations thereof.

16. The fracturing fluid of claim 14, wherein the first radiation susceptible material comprises from about 0.01 wt % to about 35 wt %, based on the total weight of the fracturing fluid.

17. The fracturing fluid of claim 14, further comprising a proppant comprising a non-radiation susceptible material.

18. The fracturing fluid of claim 14, wherein the first radiation susceptible material and the second radiation susceptible material comprise the same cations or comprise different cations.

* * * * *